G. F. HURT.
STORAGE BUILDING.
APPLICATION FILED OCT. 18, 1922.
Reissued Dec. 12, 1922. 15,505.
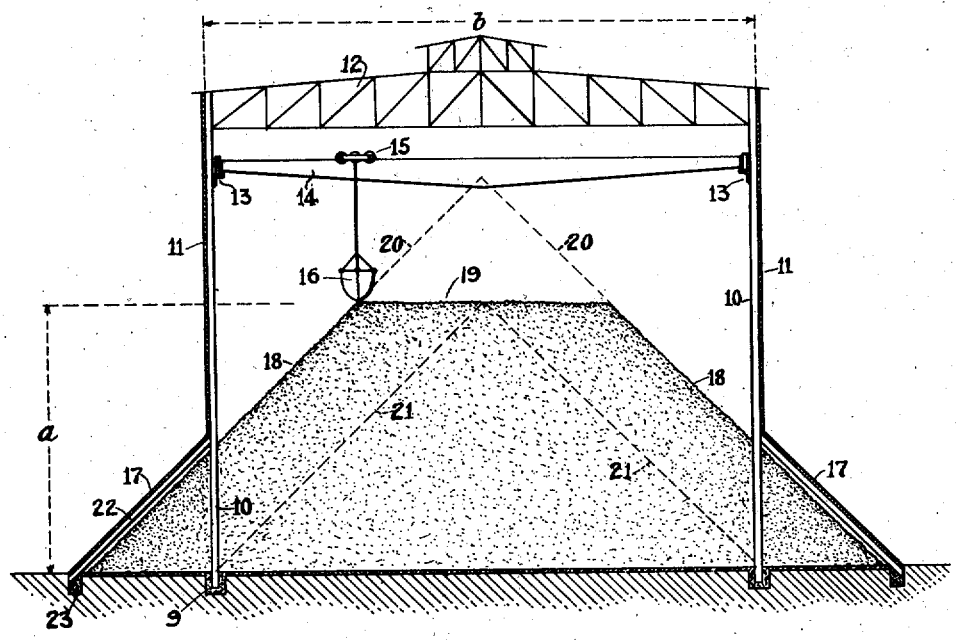
Inventor
George F. Hurt,
By his Attorneys
Rogers, Kennedy & Campbell Reissued Dec. 12, 1922. Re. 15,505

UNITED STATES PATENT OFFICE.

GEORGE F. HURT, OF NEW YORK, N. Y., ASSIGNOR, BY MESNE ASSIGNMENTS, TO JOEL HURT, OF ATLANTA, GEORGIA.

STORAGE BUILDING.

Original No. 1,330,709, dated February 10, 1920, Serial No. 299,059, filed May 22, 1919. Application for reissue filed October 18, 1922. Serial No. 595,399.

*To all whom it may concern:*

Be it known that I, GEORGE F. HURT, a citizen of the United States, residing at New York city, in the county of New York and State of New York, have invented certain new and useful Improvements in Storage Buildings, of which the following is a specification, reference being had therein to the accompanying drawing.

This invention is a novel storage building, and refers more especially to the structure and form of a building for storing and handling by means of cranes materials in bulk, of which fertilizers may be taken as an example. The main objects of the invention are to afford a storage building which is economical of structure, ample in available storage space, well adapted for the operations of the crane and safe from liability to such injury as frequently occurs to storage buildings from the pressure of the stored materials. Other and further objects and advantages of the present invention will be made clear in the hereinafter following description of a building in which the present invention is embodied, or will be apparent to those skilled in the art.

To the attainment of such objects and advantages the present invention consists in the novel storage building and the novel features of structure, arrangement, and combination herein described or illustrated. In the accompanying drawings forming a part hereof, the single figure is a more or less diagrammatic transverse section and elevation of a storage building, embodying the principles of the present invention.

It will be understood that the building may be of any desired length, the length being increased at will by the adding of units or sections, to each of which the present invention is applicable.

Referring to the drawings, the main columns 10 at the opposite sides of the building may be multiplied longitudinally as far as desired, according to the length of the building. Each longitudinal series of upright columns, suitably foundationed at 9 in the base or ground, constitutes part of the structural frame of the building, giving support to the roof, walls and mechanical handling apparatus or crane. The columns are shown as supporting outer side walls 11. As will be explained, however, these side walls or coverings, or the upright portions 11 of them, do not extend entirely to the base, but are supported uprightly in elevated location at the upper portion of the longitudinal series of columns, so that the space between the lower ends of the columns is open. Extending across from side to side are the roof trusses 12, with any suitable roofing and concomitants, as may be desired.

At the opposite interior sides of the building are the longitudinal beams or tracks 13, on which run the wheels at the ends of the crane girder or bridge 14. As a part of the crane is indicated a carriage or trolley 15, which may slide or roll transversely along the length of the girder 14, and from the carriage hangs the bucket 16, which may be lowered and elevated, and opened and closed in the usual manner. By the up and down, the transverse, and the longitudinal movements described, the bucket is capable of reaching every portion of the building with the trifling exception hereafter noted. It reaches every point between the opposite upright side walls 11, and it will be observed that below the overhead crane the space between the side walls and longitudinal column lines is free and unobstructed for the operations of the crane. The columns have no interior diagonal braces obstructing the path of the crane, but are effectively otherwise stiffened as will appear. The purpose of the crane is to serve as an overhead conveyer, either for introducing the fertilizer or other material in the form of a pile or for removing it, and the particular form and operation of the illustrated conveyer are not herein claimed.

The side walls 11 may be of very cheap construction, as they are merely protective and receive no strain. These are shown as terminating at a point above the flooring, which is approximately half the height of the desired pile of stored material. From this point extending outwardly and downwardly, preferably at a slant, are the shed extension walls or coverings 17 at each side, these also being merely protective in nature, and cheap and light of construction. Each shed or extension also has a series of frame members or braces 22, extending from the columns 10 to the ground or exterior foundation 23, therefore operating to stiffen the upright columns, as well as supporting the adjacent shed wall or covering 17. The shed extensions, as will be seen, receive at each side the "toe" of the piled material. It is herein assumed that the piled-up material will have at its sides a slope of approximately 45°. For a substantially different slope or "angle of repose" of the material being stored, the extent of the side walls 11 and the shape of the sheds 17 might be correspondingly altered.

By rough line 18, I have indicated the approximate form of the sides of the pile of stored material, which can be accommodated in the described storage building, and by 19 the preferred form of the top of such pile, it being shown truncated. In some cases the pile might be continued to a central apex, as indicated by the dotted lines 20, but this would require the roof, the crane, and therefore the building as a whole to be that extent higher, with relatively small gain of storage volume, disproportionate to the added cost of the structure. I prefer the building and the stored pile to be substantially as shown in full lines, this giving a substantially greater volume of storage for the cost of the structure than any building heretofore known with which I am acquainted.

In fact, the practical height of the stored pile is in many cases limited by the fact that excessive height gives excessive pressure at the base of the pile, which is known to be injurious to many materials. For a given height of pile, which may be designated $a$, the present invention gives the maximum volume of storage, especially in proportion to the amount and cost of the building structure itself. For the purposes of explanation the width of the building may be designated $b$, and this as shown is preferably approximately twice the height of the pile of stored material, that is, $b=2a$. At least the width is materially greater than the height of the pile, so that by the use of the extension sheds the pile will have a truncated form.

The importance of the shed extension 17 will now be explained. Without these, and assuming the side walls 11 to extend straight to the ground, these being of light and cheap construction would not suffice to serve as a retaining wall. In other words, the material could not be piled up to the height indicated by the lines 18. The dotted lines 21 indicate a triangle which is approximately the maximum storage space that would be available. Under the assumed dimensions this would be $\frac{1}{2}a\times b$ cubic feet per foot of length of the building. With such a building the only mode in which the storage volume could be increased would be to replace the side walls 11 by solid and expensively constructed retaining walls. Many stored materials tend to expand laterally, not merely from mechanical pressure, but from expansion within the mass, or equivalent action. Fertilizer has been known to expand to such an extent as to cause walls to diverge, to the permanent injury of the building. It is one of the advantages of the present invention that the necessarily heavy retaining walls to avoid this, are wholly dispensed with, and a structure which is light, inexpensive, or even temporary will adequately serve.

By the employment of the shed extension 17 this result is attained, because the material may now be piled up to the point indicated by the lines 18, 19 and 18. This is the natural form that the piled material will take. The material extends outwardly beyond the columns 10, and into the sheds 17, as indicated. The pile being of natural form, the sheds, and in fact the side walls, are required to take no pressure whatsoever.

It will readily be seen that the storage volume by the present invention will be approximately $a\times b$ cubic feet per foot of building length, that is, twice the volume available with an ordinary building in which the material is piled, as indicated by the dotted lines 21. Moreover, this practically double storage capacity is at relatively no additional expense, as the shed walls 17 are cheap and easily constructed, and they substantially merely replace the omitted lower portions of the side walls 11, while the inclined frame members 22 of the shed effectively brace the columns, enabling the latter to be of relatively lightweight. Moreover, every part of the stored material will be readily accessible to the crane buckets, with the exception of a portion of the material beneath the shed walls 17, and this is of very small proportionate amount and easily made accessible by other means. The increased volume accessible to the crane, it will be noted, is afforded without any increase whatsoever in the travel of the crane itself.

It will thus be seen that I have described a storage building embodying the principles and attaining the advantages of the present invention. Since many matters of design, arrangement, structure and combination may be variously altered without departing from the principles, it is not intended to limit the invention to such features except in so far as set forth in the appended claims.

What is claimed is:

1. A storage building adapted for storing bulk material in the form of a pile of a given height, the same having opposite series of upright columns with free unobstructed space between them for the operations of a bridge crane, opposite side wall portions supported by such columns, one or both of which terminate above the floor leaving open spaces between the lower ends of the columns, an interior overhead bridge crane located above the pile and arranged to operate longitudinally and laterally to give access to all points between the opposite side walls for introducing and removing material, and an external shed extension at the foot of one or both of the opposite side walls to receive the toe of the pile, consisting of inclined brace members extending from the said wall columns to the ground and an inclined shed covering adjacent said brace members.

2. A building for the storage and mechanical handling of bulk material, such as fertilizers, the same comprising, in combination: an overhead mechanical handling apparatus operating longitudinally and laterally within the building both to introduce in the form of a pile and to remove the material, a structural frame giving support to the roof and to said material handling apparatus and including longitudinal series of foundationed upright columns, and constructed to give free unobstructed space for the full width between the column lines for the operation of the material handling apparatus, and generally upright inclosing walls, at least one of the longitudinal inclosing walls having a substantially upright portion supported in elevated location upon the longitudinal column line and terminating substantially above the floor, and having its lower portion disposed exteriorly beyond the column line, extending outwardly and downwardly to form a longitudinal shed to receive the toe of the piled material, with a longitudinal series of foundationed frame members extending from the several columns outwardly and downwardly, supporting the shed wall and arranged to brace the column line.

In testimony whereof, I have affixed my signature hereto.

GEORGE F. HURT.